Sept. 22, 1959
T. H. LATIMER
2,905,228
SEAT SUPPORTING AND ADJUSTING MECHANISM
Filed July 11, 1955
5 Sheets-Sheet 1
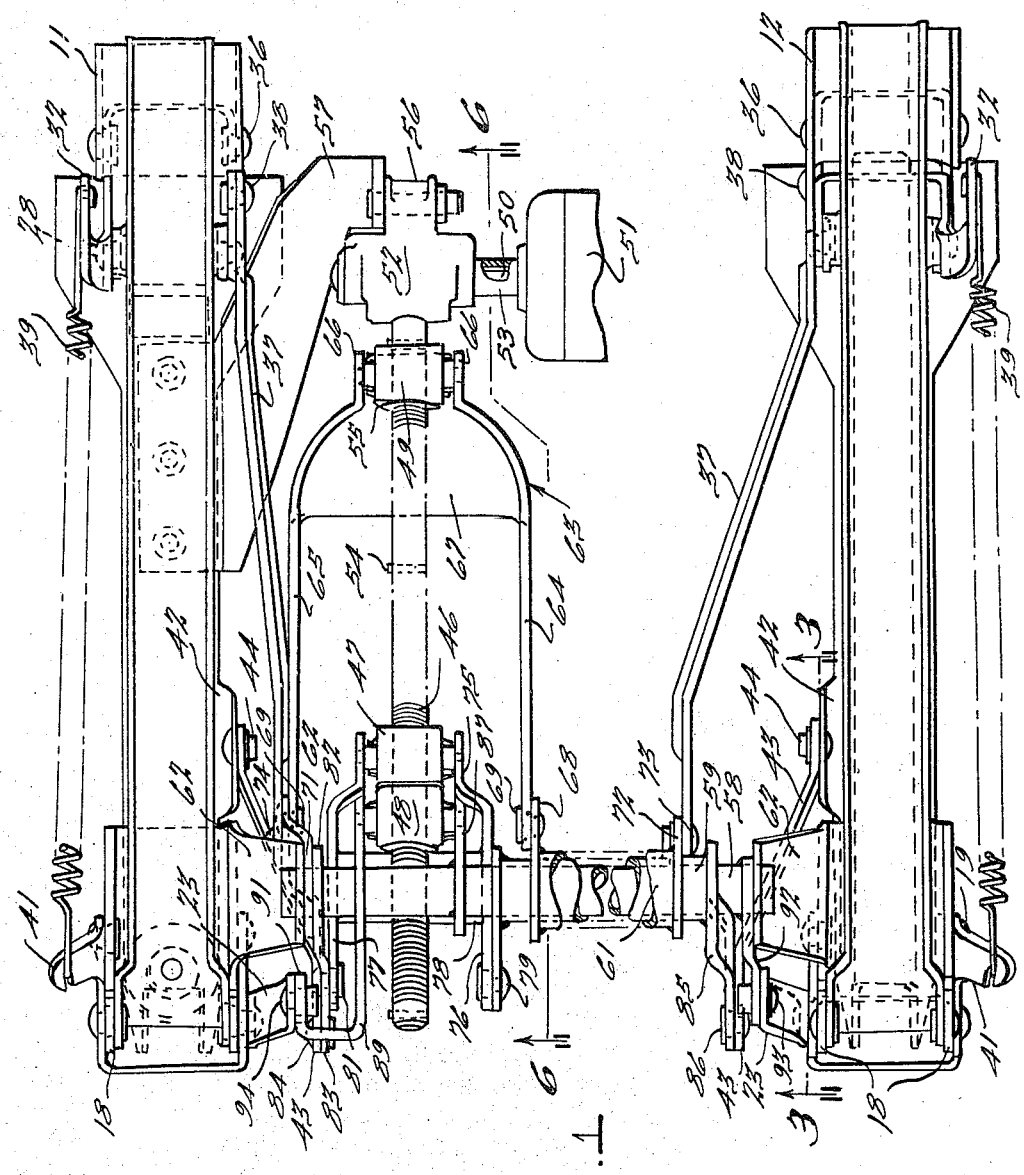
INVENTOR.
Thomas H. Latimer
BY
Harness, Dickey & Pierce
ATTORNEYS.

Sept. 22, 1959 T. H. LATIMER 2,905,228
SEAT SUPPORTING AND ADJUSTING MECHANISM
Filed July 11, 1955 5 Sheets-Sheet 2
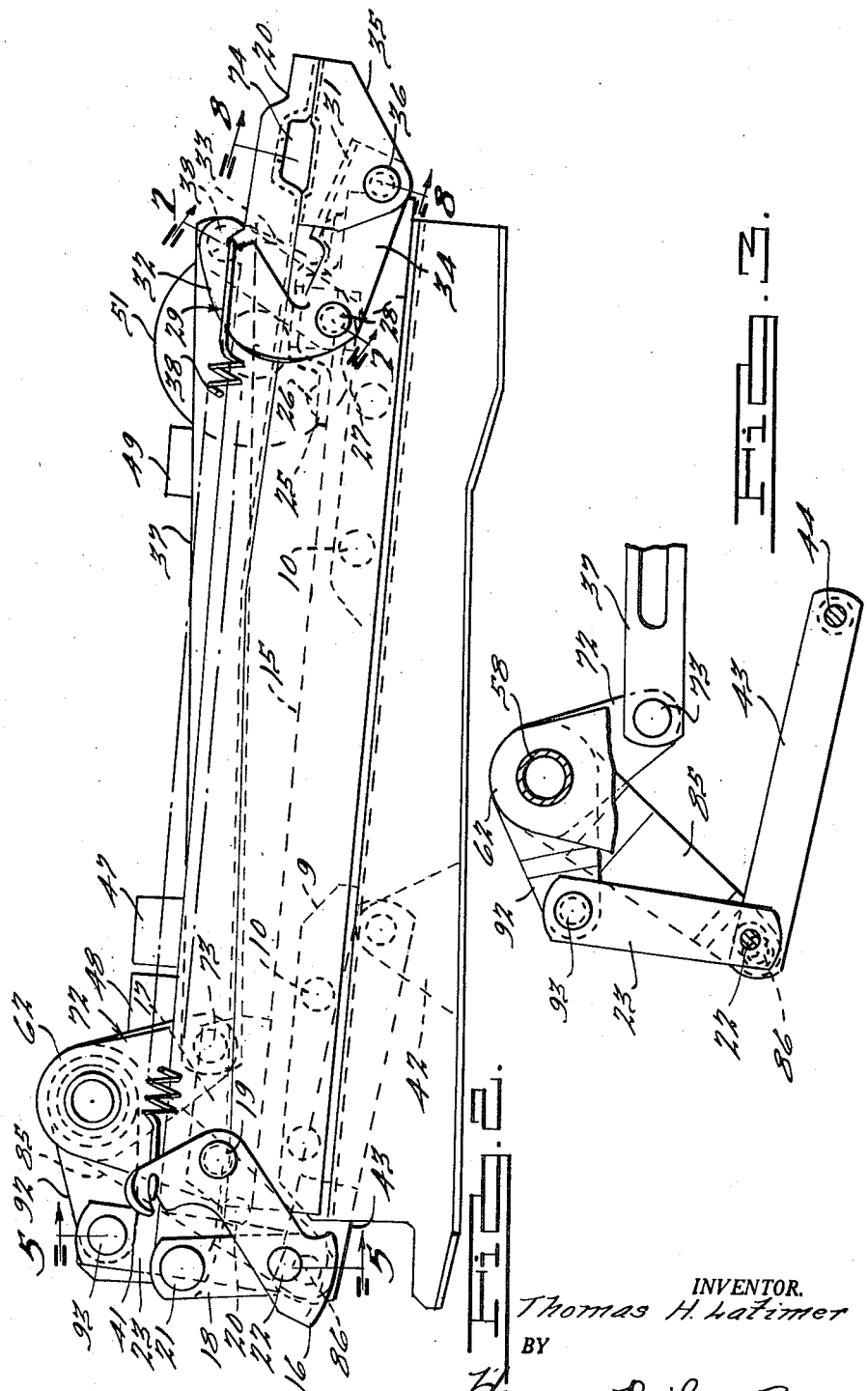
INVENTOR.
Thomas H. Latimer
BY
Harness, Dickey & Pierce.
ATTORNEYS Sept. 22, 1959　　　　　T. H. LATIMER　　　　　2,905,228
SEAT SUPPORTING AND ADJUSTING MECHANISM
Filed July 11, 1955　　　　　　　　　　　　　5 Sheets-Sheet 3
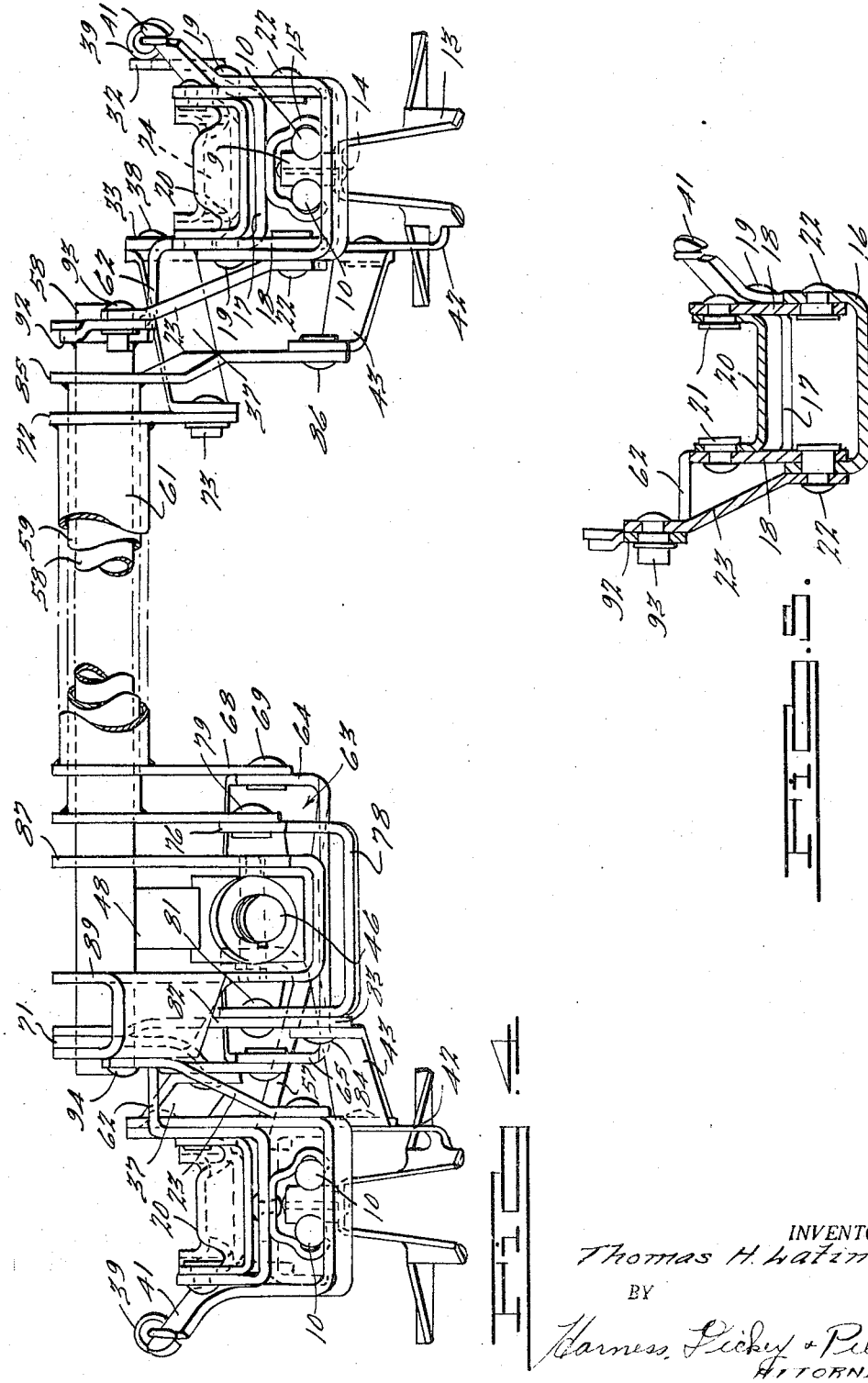
INVENTOR.
Thomas H. Latimer
BY
Harness, Dickey & Pierce
ATTORNEYS.

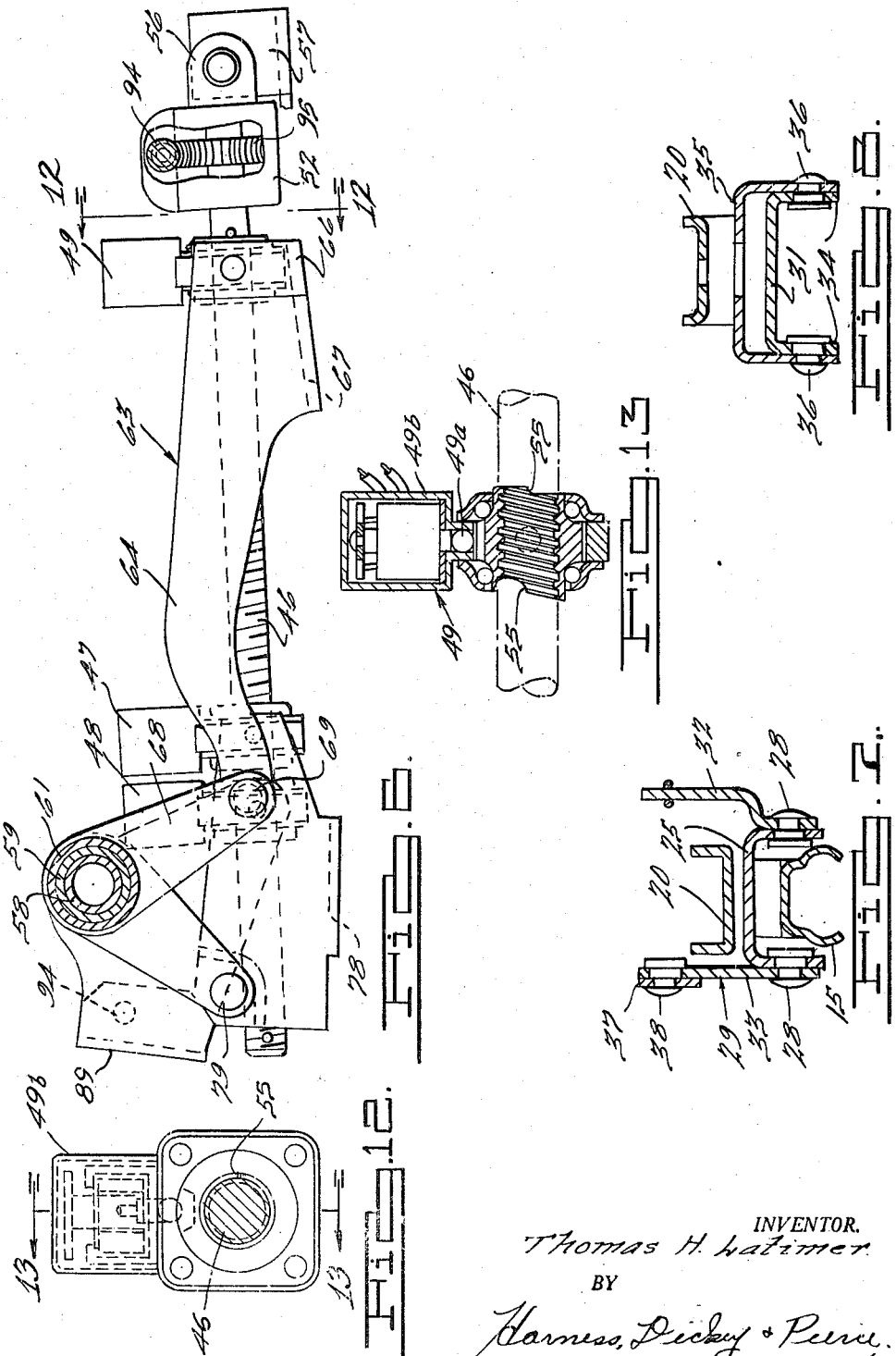

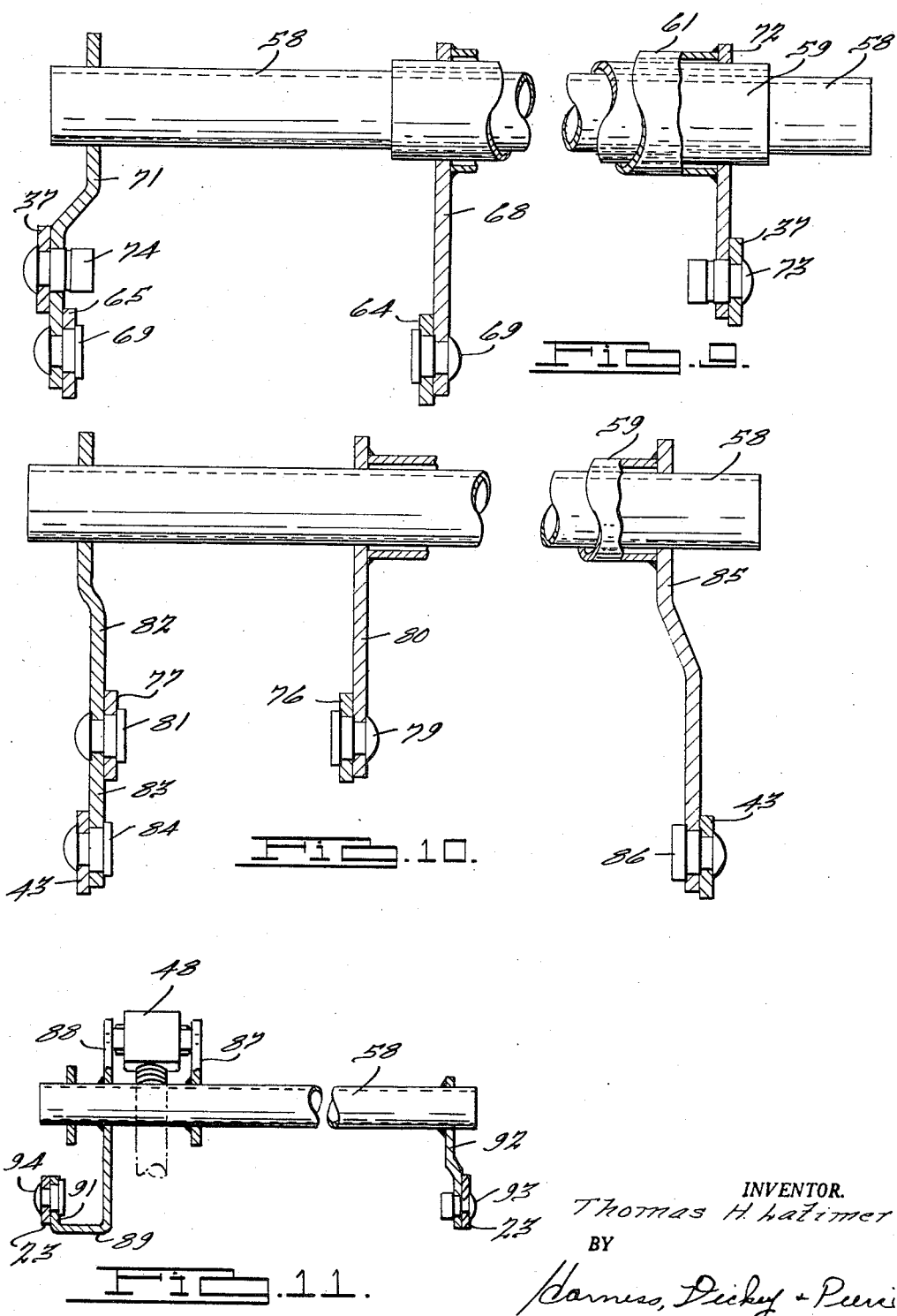

United States Patent Office 2,905,228
Patented Sept. 22, 1959

2,905,228

SEAT SUPPORTING AND ADJUSTING MECHANISM

Thomas H. Latimer, Birmingham, Mich., assignor to American Metal Products Company, Detroit, Mich., a corporation of Michigan Application July 11, 1955, Serial No. 521,204

8 Claims. (Cl. 155—14)

This invention relates to seat supporting mechanisms, and particularly to a seat supporting mechanism which raises and/or lowers the front or rear of the seat and adjusts the seat forwardly and backwardly.

The present invention pertains to a seat supporting mechanism which is actuated by a single motor to adjust the seat forwardly and rearwardly and upwardly and downwardly at the forward and/or the rear end thereof at the will of the operator.

Heretofore, such adjusting mechanism required the use of a plurality of power elements in order to move the seat in different positions. When using the single actuating element of the present invention, tubular torsion bars are provided which are nested within each other in telescoping relationship so that the seat track elements on each side of the seat will operate in unison. The force applying device embodies a motor operating through a worm mechanism for driving a lead screw which has three nuts thereon which are clutched to the thread of the lead screw by a solenoid carried by each of the nuts. The length of the lead screw is proportioned for travel of each of the lead screws a predetermined distance thereon, selected for the amount of adjustment to be provided to the seat supporting mechanism for movement forwardly and rearwardly and upwardly and downwardly at the forward and rear edges of the seat. By providing a pivotal relationship to the lead screw, one of the three nuts may be directly connected to a torsion tube while the other two are connected thereto by a link. If the lead screw is fixed, then the three nuts must be connected by links with the torsion tubes so as to permit the nuts to operate independently; otherwise the arcuate movement of the torsion tube arms would cause binding. In the arrangement herein illustrated, the lead screw is pivoted while two of the nuts have the link connection to the torsion tubes and elements to be operated, while the third nut is directly connected thereto. The operation of one of the nuts on the lead screw can advance the pair of tracks forwardly or rearwardly. The operation of another nut on the lead screw raises and lowers the front end of the seat. The operation of the third nut on the lead screw raises and lowers the rear end of the seat. These operations may be independently carried out or may be performed simultaneously.

Accordingly, the main objects of the invention are: to provide a seat supporting mechanism with a motor driven device by which the mechanism may be moved forwardly or rearwardly and raised or lowered at the front and rear ends simultaneously or independently; to provide a pair of spaced seat supporting devices having operating mechanism therefor which moves the seat forwardly or rearwardly and upwardly or downwardly at the forward and rear edges independently or simultaneously at one side of the seat and through the use of nested torsion tubes duplicating the same movement on the other side of the seat; to provide a pair of spaced seat supporting devices having means for moving the seat forwardly or rearwardly and upwardly or downwardly at the forward and rear edges simultaneously or independently from suitable link mechanism actuated by power means directly connected to one of the devices and three torsion tubes which are mounted in nested relation one within the other to actuate the link mechanism on the other device in unison with the operation of the first device, and, in general, to provide a seat supporting mechanism actuated from a single lead screw and motor which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Figure 1 is a plan view of a power operated seat supporting mechanism, embodying features of the present invention;

Fig. 2 is a side view in elevation of the seat supporting mechanism illustrated in Fig. 1;

Fig. 3 is a broken sectional view of the structure illustrated in Fig. 1, taken on the line 3—3 thereof;

Fig. 4 is a view in elevation of the seat supporting mechanism illustrated in Fig. 1, as viewed from the front thereof;

Fig. 5 is a sectional view of the structure illustrated in Fig. 2, taken on the line 5—5 thereof;

Fig. 6 is a sectional view of the structure illustrated in Fig. 1, taken on the line 6—6 thereof;

Fig. 7 is a sectional view of the structure illustrated in Fig. 2, taken on the line 7—7 thereof;

Fig. 8 is a sectional view of the structure illustrated in Fig. 2, taken on the line 8—8 thereof;

Fig. 9 is a broken sectional view of one set of operating tubes, arms and links;

Fig. 10 is a broken sectional view of another set of operating tubes, arms and links;

Fig. 11 is a broken sectional view of a third operating tube having arms and links thereon;

Fig. 12 is a sectional view of the structure illustrated in Fig. 6, taken on the line 12—12 thereof, and Fig. 13 is a sectional view of the structure illustrated in Fig. 12, taken on the line 13—13 thereof.

The power operated seat supporting structure of the present invention comprises a pair of seat supporting devices 11 and 12, one for the left and the other for the right-hand side of the seat, as viewed when sitting in the seat. Each of the supporting devices is the same except that one is of the opposite hand from the other and except for the differences due to the support for the force applying mechanism being provided on one of the supporting devices and the use of nested torsion bars through which the force is applied to the other supporting device. Since the supporting devices 11 and 12 are substantially the same, only one will now be described.

An inverted U-shaped base support 13 has apertured flanges thereon by which the support is secured to the floor of a vehicle or any other floor to which the supporting mechanism is to be attached. Bars 9, having elongated recesses for spaced balls 10, are secured to the top web of the base support 13 as by rivets 14. The balls support a longitudinally movable track element 15 for adjustment forwardly and rearwardly on the base support. An upwardly extending U-shaped bracket 17 is welded or otherwise secured to the forward end of the track element 15, the bracket 17 having a U-shaped yoke 16 secured thereto by pivots 19. Links 18 are secured by pivots 21 to a seat supporting channel 20 positioned for upward and downward movement above the track element 15. The opposite ends of the links 18 are connected by pivots 22 to the forward ends of the yoke 16. The pivot 22 at the inner side of the yoke 16 is connected by a link 23 to a force applying mechanism hereinafter to be described.

The opposite end of the seat supporting channel 20 has a bracket 25 mounted thereon by rivets 26. The bracket 25 has downwardly extending ears 27 for supporting pivots 28. A pair of bell crank levers 29 joined by a web 31 are pivotally mounted on the pivots 28. The bell cranks 29 have upwardly extending arms 32 and 33 and rearwardly extending arms 34 which are joined by the web 31. A downwardly extending channel bracket 35 is secured as by welding to the rear end of the seat supporting channel 20. Pivots 36 connect the ends of the arms 34 to the downwardly extending flanges of the bracket 35. A link 37 is connected to the arm 33 of the bell crank 29 by a pivot 38 and to the force applying mechanism to be hereinafter described. A spring 39 has on end hooked over the arm 32 of the bell crank 29 and the other end hooked over an arm 41 extending upwardly from the yoke 16 at the front of the device. The spring applies a tension to the arms 32 and 41 for assisting in the raising and resisting the lowering of the forward and rear edges of the seat.

An arm 42 extends upwardly from the side of the U-shaped base support 13 to which one end of a link 43 is secured by a pivot 44. The opposite end of the link 43 is connected to the force applying mechanism hereinafter to be described. Thus, when it is desired to raise or lower the front edge of the seat, the links 23 of the supporting devices are raised or lowered to swing the yoke 16 about the pivot 19 and move the links 18 upwardly or downwardly, to thereby move the front end of the seat supporting channel 20 upwardly or downwardly. The links 37 of the seat supporting devices are moved forwardly or rearwardly to swing the arms 34 of the bell cranks 29 upwardly or downwardly to raise or lower the rear end of the seat supporting channel 20. By having the force applying mechanism apply a pulling or pushing force to the link 43, all of the mechanism supported upon the track elements 15, including the force applying mechanism, is moved forwardly and rearwardly on the balls 10. The force applying mechanism, therefore, must act simultaneously upon the links 23, 37 and 43 on both of the seat supporting devices 11 and 12 to produce the six-way operation of the seat.

The force applying mechanism comprises a lead screw 46 having solenoid operated devices 47, 48 and 49 mounted thereon, as illustrated, described and claimed in the copending application of R. J. Williams et al., Serial No. 481,562, filed January 13, 1955, now U.S. Patent No. 2,857,776, and assigned to the assignee of the present invention. The gear set for driving the lead screw from a motor 51 is supported within a casing 52, preferably as disclosed in the copending application of Robert I. Homier, Serial No. 521,264, filed July 11, 1955, and assigned to the assignee of the present invention. The motor 51 is supported on the casing 52 by a sleeve 53 through which the motor shaft 50 extends. This shaft is connected to the shaft of a worm 94 which engages a worm wheel 95 secured to the end of the lead screw 46 within the case. Pins 54 limit the travel of the nuts along the lead screw when a shoulder 55 on the nut strikes a pin and disengages the ball, the clutches 47a, 48a or 49a render the associated solenoid devices 47b, 48b or 49b ineffective for urging the ball into clutch relation when retained energized, as described in the above mentioned copending Williams et al. application. The casing 52 has an apertured boss 56 on the rear end thereof through which a pin extends which supports the rear end of the mechanism on a bracket 57 which is riveted to the top of the track element 15 of the supporting device 11.

Since the force applying mechanism is carried by the seat supporting device 11, the mechanism will directly actuate the links 23, 37 and 43 on the device 11, but being remote from the device 12 rigid operating structure must be provided to transfer the operating force to the device 12 without distortion, so that both devices will have the force applied thereto equally and will be adjusted in unison. For this means, three torsion tubes 58, 59 and 61 mounted in nested relation have the inner torsion tube 58 pivotally secured on upwardly extending arms 62 at the inner adjacent sides of the bracket 17. A yoke 63 has spaced arms 64 and 65, the rearward ends 66 of which are pivotally connected to the nut 49, the arms being connected together adjacent to the nut by a web 67. The arm 64 is pivoted to an arm 68 which is secured to the adjacent end of the torsion tube 61 by a pivot 69. The arm 65 is connected to the lower end of a link 71 pivoted on the adjacent end of the torsion tube 58, the link being the same length as the arm 68. The opposite end of the torsion tube 61 has an arm 72 fixed thereon which is connected by a pivot 73 to the end of the link 37 on the device 12. A pivot 74 on the link 71 connects the end of the arm 37 on the device 11, the distance from the center of the torsion tubes to the pivot 74 being the same as the distance from the center of the torsion tubes to the pivot 73, as illustrated in Fig. 9. When the yoke 63 is moved forwardly, the arms 72 and links 71 will swing the same amount and move the pivots 73 and 74 equal amounts to pull the links 37 on both of the devices 11 and 12 forwardly. This movement rocks the bell cranks 29 counterclockwise, moving the rear end of the seat supporting channel 20 upwardly.

The rear end of the channel and the bracket 35 are offset to provide an aperture 74 for the reception of a bolt and washer to secure the rear edge of the seat thereon. An aperture is provided in the forward end of the channel 20 for receiving a bolt for securing the front portion of the seat to the channel. Therefore, by moving the yoke 63 forwardly and rearwardly, the links 37 are moved forwardly and rearwardly and the bell cranks 29 are rocked clockwise and counterclockwise for lowering and raising the rear edge of the seat supporting channel member 20.

The nut 47 is pivotally connected to the rear end of a yoke 75, having a pair of arms 76 and 77 extending forwardly thereof and joined together by a web 78. The arm 76 is secured by a pivot 79 to an arm 80 rigidly secured on the adjacent end of the intermediate torsion tube 59. The arm 77 is secured by a pivot 81 to a link 82 which is pivotally supported on the torsion tube 58, the distance between the pivot 81 and the center of the tube being the same as the distance between the pivot 79 and the center of the tube, as illustrated in Fig. 10. The link 82 extends downwardly at 83 and is connected by a pivot 84 to the forward end of the link 43 of the device 11. An arm 85 is rigidly secured to the opposite end of the torsion tube 59, the free end having a pivot 86 extending therethrough to which the end of the link 43 of the device 12 is secured. The distance between the pivots 84 and 86 and the center of the torsion tubes is equal. When the nut 47 is moved rearwardly from the position illustrated in Fig. 1, the arm 85 and link 82 are swung rearwardly, causing the seat tracks 15 and seat to move forwardly. The links 43 to which the ends of the arm 85 and link 82 are pivoted cannot move rearwardly since they are secured by pivots 44 to the arms 42 of the inverted channel-shaped base members 13. Therefore, by the driving of the nut 47 forwardly or rearwardly, the seat may be adjusted forwardly or rearwardly of the supporting devices.

The torsion tube 58 has a pair of arms 87 and 88 rigidly secured thereto with spaced ends pivots to the nut 48. The end of the arm 88 is bent laterally at 89 and reversely bent at 91. An arm 92 is secured to the opposite end of the torsion tube 58 having a pivot 93 thereon aligned with a pivot 94 on the rearwardly extending end 91 of the arm 88, as illustrated in Fig. 11. The pivots 93 and 94 are connected to the upper ends of the links 23 and raise the links when the nut 48 is moved forwardly and lower the links 23 when the nut 48 is moved rearwardly. With this arrangement, the forward edge of the seat is raised or lowered.

The distance between the supporting devices 11 and 12 requires the use of the telescoped torsion tubes when a force applying mechanism using a single lead screw is employed. When using the nested torsion tubes, the same movement is produced to the elements of the remote supporting device as to the adjacent device. When the devices are placed closer together for supporting a narrow seat, it is to be understood that the torsion tubes are eliminated and the yokes and arms directly operate the links 23, 37 and 43 directly on both of the supporting devices. The use of the torsion tubes eliminates the flexing which would occur in other types of structure and the same movement is produced therethrough to the remote seat supporting device as is produced to the adjacent device.

What is claimed is:

1. A seat supporting mechanism comprising a pair of spaced seat supporting devices, each device having a base element, a track element movable forwardly and rearwardly on the base element, and an elongated seat supporting element supported on raising and lowering means mounted on pivots located at the front and rear portions of the movable track element, a bracket on the track element of one of said supporting devices, a selectively actuated force applying mechanism supported on said bracket, and means actuated by said force applying mechanism for selectively pivoting the raising and lowering means of said pair of devices for raising and lowering the ends of the seat supporting elements and moving said track element forwardly and rearwardly.

2. A seat supporting mechanism comprising a pair of spaced seat supporting devices, each device having a base element, a track element movable forwardly and rearwardly on the base element, and a seat supporting element supported on raising and lowering means mounted on pivots located at the front and rear portions of the movable track element, a bracket on the track element of one of said supporting devices, a force applying mechanism supported on said bracket, and means actuated by said force applying mechanism for raising and lowering the ends of the seat supporting elements and for moving said track element forwardly and rearwardly simultaneously or independently at the will of the operator.

3. A seat supporting mechanism comprising a pair of spaced seat supporting devices, each device having a base element, a track element movable forwardly and rearwardly on the base element, and a seat supporting element supported on raising and lowering means mounted on pivots located at the front and rear portions of the movable track element, a bracket on the track element of one of said supporting devices, a force applying mechanism supported on said bracket, means actuated by said force applying mechanism for raising and lowering the ends of the seat supporting elements and for moving said track element forwardly and rearwardly, said actuated means comprising three torsion tubes in nested relation pivotally supported on said devices and directly rotated by said force applying mechanism which operates the track and seat supporting elements on the device on which the mechanism is mounted, and arms on the opposite ends of said torsion tubes for raising and lowering the ends of the seat supporting elements and moving the track element forwardly and rearwardly on the other seat supporting device in synchronism with the movement of the elements on the seat supporting device on which the said mechanism is mounted.

4. A seat supporting mechanism comprising a pair of spaced seat supporting devices, each device having a base element, a track element movable forwardly and rearwardly on the base element, and a seat supporting element supported on raising and lowering means mounted on pivots located at the front and rear portions of the movable track element, a bracket on the track element of one of said supporting devices, a force applying mechanism supported on said bracket, three torsion tubes disposed in nested relation and supported for rotational movement on the forward ends of said track elements, a pair of links freely pivotal on one of said torsion tubes adjacent to said supporting device having said bracket, a pair of arms on two of said torsion tubes, pivots on said arms and links in aligned relation to each other, yokes connected to said pivots, arms on the opposite ends of said two torsion tubes having the pivots thereon aligned with additional pivots on said links, and means connecting said last pivots to said raising and lowering means at one end of said devices and to the base elements of said supporting devices.

5. A seat supporting mechanism comprising a pair of spaced seat supporting devices, each device having a base element, a track element movable forwardly and rearwardly on the base element, and a seat supporting element supported on raising and lowing means mounted on pivots located at the front and rear portions of the movable track element, a bracket on the track element of one of said supporting devices, a force applying mechanism supported on said bracket, three torsion tubes disposed in nested relation and supported for rotational movement on the forward ends of said track elements, a pair of links freely pivotal on one of said torsion tubes adjacent to said supporting device having said bracket, a pair of arms on two others of said torsion tubes, pivots on said arms and links in aligned relation to each other, yokes connected to said pivots, arms on the opposite ends of said two torsion tubes having the pivots thereon aligned with additional pivots on said links, means connecting said last pivots to said raising and lowering means at one end of said devices and to the base elements of said supporting devices, a pair of arms secured to said one of said torsion tubes, one of said arms being extended and having a pivot thereon, an arm on the opposite end of said one of said torsion tubes having a pivot thereon aligned with said last pivot, and means connecting said last pivots to the raising and lowering means at the other end of said seat supporting track.

6. A seat supporting mechanism comprising a pair of spaced seat supporting devices, each device having a base element, a track element movable forwardly and rearwardly on the base element, and a seat supporting element supported on raising and lowering means mounted on pivots located at the front and rear portions of the movable track element, a bracket on the track element of one of said supporting devices, a force applying mechanism supported on said bracket, three torsion tubes disposed in nested relation and supported for rotational movement on the forward ends of said track elements, a pair of links freely pivotal on one of said torsion tubes adjacent to said supporting device having said bracket, a pair of arms on two of said torsion tubes, pivots on said arms and links in aligned relation to each other, yokes connected to said pivots, arms on the opposite ends of said two torsion tubes having the pivots thereon aligned with additional pivots on said links, means connecting said last pivots to said raising and lowering means at one end of said devices and to the base elements of said supporting devices, and means on said force applying mechanism for actuating said three torsion tubes independently or simultaneously at the will of the operator.

7. A seat supporting mechanism comprising a pair of spaced seat supporting devices, each device having a base element, a track element movable forwardly and rearwardly on the base element, and a seat supporting element supported on raising and lowering means mounted on pivots located at the front and rear portions of the movable track element, a bracket on the track element of one of said supporting devices, a force applying mechanism supported on said bracket, said force applying mechanism comprising a motor, a lead screw driven by said motor and three nuts on said lead screw having solenoid actuated clutch mechanisms, three nested torsion tubes pivotally mounted between said supporting devices, two links freely pivoted on one of said torsion tubes on which an arm is secured, sets of arms on the torsion tubes, one arm of each set simulating a part of said freely pivoted links and the associated arm, the other arm of each set simulating a different part of said freely pivoted links and associated arms, two swinging yokes having spaced arms interconnecting two of the arms of each set and said freely pivoted links, pivots connecting said yokes to two of said nuts, pivots connecting the third arm of the set to said associated arms, and pivots connecting said links and associated arm and the other arms of the set to the raising and lowering means and to the base element.

8. In a seat supporting and operating mechanism, a pair of spaced seat supporting devices, each device including a base support, a track element on each base support movable forwardly and rearwardly thereon, a raising and lowering means on the track element at each end thereof, a seat supporting element above each track element which has the ends thereof raised and lowered by said raising and lowering means to which the ends of the seat supporting element are connected, a motor driven lead screw means supported on one of said track elements, three nuts on said lead screws, each nut having a solenoid operated clutch mechanism, three nested torsion tubes pivotally mounted between said devices, arms on said torsion tubes some of which are rigid therewith others of which are pivoted thereon, means interconnecting said nuts to certain of said arms on said torsion tubes, and additional means interconnecting certain of said arms to said base support and to said raising and lower means at each end of said track element whereby when the nuts are moved independently the ends of the seat supporting element are raised and lowered and the track is moved forwardly and rearwardly independently.

References Cited in the file of this patent

UNITED STATES PATENTS

| | | |
|---|---|---|
| 1,244,956 | Clanton | Oct. 30, 1917 |
| 2,345,182 | Corber | Mar. 28, 1944 |
| 2,596,363 | Breguet | May 13, 1952 |
| 2,609,029 | Haberstump | Sept. 2, 1952 |
| 2,647,558 | Rappl | Aug. 4, 1953 |
| 2,809,688 | Brundage | Oct. 15, 1957 |